United States Patent [19]
Dietz et al.

[11] Patent Number: 6,084,223
[45] Date of Patent: Jul. 4, 2000

[54] METHOD OF WELDING WORKPIECES AND APPARATUS FOR CARRYING IT OUT

[75] Inventors: Christoph Dietz, Obertshausen; Markus Koegel-Hollacher, Haibach, both of Germany

[73] Assignee: Jurca Optoelektronik, Germany

[21] Appl. No.: 09/096,397

[22] Filed: Jun. 11, 1998

[30] Foreign Application Priority Data

Jun. 13, 1997 [DE] Germany .......................... 197 24 986

[51] Int. Cl.[7] .................................................. B23K 13/01
[52] U.S. Cl. ................ 219/617; 219/121.83; 219/121.64
[58] Field of Search .................... 219/617, 608, 219/121.63, 121.64, 121.83

[56] References Cited

U.S. PATENT DOCUMENTS

| | | | |
|---|---|---|---|
| 4,835,357 | 5/1989 | Schalk | 219/121.64 |
| 5,045,668 | 9/1991 | Neiheisel et al. | 219/121.83 |
| 5,272,312 | 12/1993 | Jurca | 219/121.83 |
| 5,607,605 | 3/1997 | Musasa et al. | 219/121.64 |
| 5,651,903 | 7/1997 | Shirk | 219/121.64 |
| 5,681,490 | 10/1997 | Chang | 219/121.64 |

*Primary Examiner*—Teresa Walberg
*Assistant Examiner*—Shawntina T. Fuqua

[57] ABSTRACT

The quality of a weld is usually monitored via the different wavelength radiation issuing from the weld point. During the welding of workpieces, however, this radiation (S) is also modulated by the instantaneous width (b) of the gap existing between the workpieces. To avoid the generation of unnecessary fault signals (F) on the one hand and excessive tolerance bands for the permitted signal range on the other hand, the invention proposes that a correction formula ($\Delta S(B)$) which reproduces the dependency of the radiation signals (S) on the gap width (B) be produced in a preliminary test. The gap width (B) in the weld point is defined during welding. A correction value ($\Delta S(B)$) is defined during the welding process on the basis of the correction formula ($\Delta S(B)$) and the instantaneous gap width (B) in the weld point and the limit values (MAx($B_o$), MIN($B_o$)) previously defined for a gap width zero are displaced by this correction value ($\Delta S(B)$).

15 Claims, 5 Drawing Sheets

METHOD OF WELDING WORKPIECES AND APPARATUS FOR CARRYING IT OUT

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates to a method of welding workpieces, between which there is a gap, at least in portions, in which a) at least one signal corresponding to radiation issuing from the workpieces during the welding process is generated for monitoring and controlling the welding process;

b) the limit value $MAX(B_0)$, $MIN(B_0)$ of the radiation signal which must not be exceeded or fallen below with gap width zero for maintaining a weld of predetermined minimum quality is determined in a preliminary test;

c) the signal is compared with at least one predetermined limit value $MAX(B)$, $MIN(B)$ for checking the quality of the welding process and a fault signal is generated if this limit value is exceeded or fallen below.

2. Discussion of Relevant Art

A method of this type is known from U.S. Pat. No. 5,272,312. With this method, radiation which is generated by the workpieces owing to a machining laser beam is used to monitor and control the machining process. On the one hand, this radiation is usually ultraviolet light which issues from the steam capillaries generated in the workpieces by the machining laser beam, On the other hand, it is infrared radiation which is irradiated from the molten region following the steam capillaries when viewed in the direction of movement of the machining head but also the already consolidated region located after the weld point. Holes or open pores created by the spraying of material from the weld seam can be determined and documented by means of infrared radiation.

The signals typical of a fault can only be detected after the fault has been created. Therefore, these signals cannot be used for ruling out the cause of defective welds. However, these signals can be used to document the quality of the welding process. In fact, holes or open pores and therefore also the signals produced by them can be tolerated to a certain extent. For this reason, limit values for the signals which correspond to infrared or/and ultraviolet radiation and ensure a specific quality of welding can be determined, for example in preliminary tests, if the signals lie within these limit values. If the limit values are exceeded or fallen below during the welding process, a fault signal is generated. The real time evaluation of the fault signals during the welding process finally opens into a calculation of the probability that a significant welding fault has been created.

In particular during the welding of metal sheets or pipes in which there is a gap between the workpieces, it is difficult to monitor and control the quality of the welding process with the apparatus known from U.S. Pat. No. 5,272,312 The gap per se between the workpieces should have a minimum width so the welding process can be carried out as effectively as possible. In practice, however, the gap width varies and normally lies between 0 and 100 $\mu$m. With a typical diameter of the weld point of about 250 $\mu$m (laser beam of a $CO_2$ laser focused by mirrors), a gap width of 100 $\mu$m leads to a considerable loss of up to 50% of laser power which can be introduced into the workpieces.

Since the gap width modulates the power which can be introduced into the workpieces for melting the metal, the signals detected by the welding monitoring means and corresponding to the radiation issuing from the workpieces are also modulated by the gap width. However, the decline in the power which can be introduced into the workpieces and the associated weakening of the corresponding radiation signals does not necessarily mean the presence of a welding fault. To avoid the continuous display of welding faults during the welding of workpieces between which there is a gap, owing to the weld monitoring process used for quality control, the window limited by the limit values for the detected signals has to be set wider than necessary with a gap-free weld. However, the drawback is that it is sometimes impossible reliably to detect faults actually occurring in such a butt weld, for example owing to holes or open pores.

SUMMARY OF THE INVENTION

It is accordingly an object of the present invention to provide a process of the type mentioned at the outset with which small faults actually occurring during the welding of workpieces, between which there is a gap, can also be reliably detected.

The above-mentioned object is achieved in that in a preliminary test d) a correction formula is produced which represents the dependency of the radiation signal on the gap width in the weld point with a predetermined minimum quality of the weld; and during the actual welding process e) the width of the gap in the weld point is defined; and f) the prevailing limit values are displaced by an amount corresponding to the prevailing gap width in the weld point relative to the limit values $MAX(B_0)$, $MIN(B_0)$ determined in preliminary tests on the basis of the correction formula.

With the method according to the invention, therefore, limit values dependent on the width of the gap in the weld point are used for the permitted signal window rather than rigid limits. The dependency of the radiation signals on the gap width with a specific quality of weld can be determined, for example, in a preliminary test. In this way, it is possible to allow for the fact that a varying strength of the monitoring signals does not necessarily mean a welding fault but can be due to an acceptable change in the gap width. Instead, the minimum and maximum permitted radiation signal size corresponding to a specific quality of the weld can be adapted continuously such that, on the one hand, unnecessary fault messages are avoided but on the other hand the tolerance range is sufficiently narrow to detect actually occurring welding faults, even if they are small, by the monitoring process.

A further object of the present invention is to provide an apparatus for carrying out the above-mentioned method, with a) an apparatus which generates a weld point;

b) at least one sensor to which radiation issuing from the workpieces is supplied for monitoring and controlling the welding process and which conveys a signal corresponding to this radiation to an evaluating and monitoring unit; wherein c) the evaluating and monitoring unit comprises a memory in which there can be stored at least one limit value MAX($B_0$), MIN($B_0$) which is determined in a preliminary test and which must not be exceeded or fallen below with gap width zero in a weld of predetermined quality;

d) the evaluating and monitoring unit comprises a comparator which compares the prevailing radiation signals with the stored limit value and generates a fault signal when this limit value is exceeded or fallen below.

This object is achieved in that e) the apparatus comprises at least one sensor by means of which the gap width in the weld point can be defined;

f) the evaluating and monitoring unit comprises a memory in which there can be stored a correction formula which reproduces the dependency of the signal on the gap width in the weld point with a predetermined minimum quality of the weld;

g) the evaluating and monitoring unit comprises a calculating circuit which displaces the limit values during the welding process by an amount corresponding to the instantaneous gap width in the weld point according to the stored correction formula.

On the one hand, the advantages of this apparatus are the same as those of the above-mentioned method according to the invention. Furthermore, only a few additional components are required (sensor, calculating circuit) to form the apparatus according to the invention.

According to one feature of the invention, the apparatus for generating the weld point comprises a laser. This development is particularly recommended in the welding of plates and metal sheets.

According to a feature of the invention, the apparatus for generating the weld point comprises a high frequency induction welding apparatus which is particularly suitable for the welding of pipes.

According to a feature of the invention, the sensor which detects the gap width is so orientated that it leads the weld point at a constant distance. A second sensor which detects the relative displacement between the first sensor and the workpieces, occurring during the welding process, is also provided. Furthermore, the evaluating and monitoring unit according to a feature of the invention comprises a memory in which the width gap on passing the first sensor can be stored and a comparator which retrieves the stored width when the weld point passes the position with the stored width. With this embodiment of the apparatus according to the intention, it is possible spatially to separate the sensor for determining the gap width in the weld point from the apparatus generating the weld point The construction of the apparatus is thus simplified and the accessibility and maintenance facilities improved.

With the development according to a feature of the invention, the first sensor is an electronic camera, preferably a CCD camera. This apparatus is commercially available. In the form, for example, of a sectional drawing triangulation camera it can be used for particularly accurate detection of the gap width.

According to a feature of the invention, the second sensor which detects the relative displacement between first sensor and the workpieces can be an incremental transducer which is often already provided or can be obtained inexpensively and has the robustness required for a welding installation.

The apparatus according to a feature of the invention is distinguished in that the evaluating and monitoring unit is so orientated that, during at least one preliminary test, the limit value corresponding to a predetermined quality for the radiation signal can be defined in a self-learning manner by the evaluating and monitoring unit and can be stored in a memory. This development enables characteristics specific to the installation, the characteristics of the workpieces and their geometries to be detected and allowed for in a particularly reliable manner. A preliminary test of this type can also be carried out semi-automatically in that pictures of the welded joint are taken and averaged continuously, for example during the preliminary test and the maxima and minima of the radiation signals corresponding to the welding quality established hereby are recorded. This procedure also allows for a possible shift between the zero point of the camera coordinate system and the position of the weld point within the coordinate system of the focusing head.

Similarly, according to a feature of the invention, the evaluating and monitoring unit is orientated such that the dependency of the signals on the gap width in the weld point can be defined in a self-learning manner by the evaluating and monitoring unit during a preliminary test with a predetermined minimum quality of the weld and a corresponding correction formula can be stored in a memory.

If the apparatus according to a feature of the invention comprises a sensor which detects the ultraviolet radiation essentially originating from the steam capillaries in the weld point and which conveys corresponding signals to the evaluating and monitoring unit, information about the depth of welding can be obtained under certain circumstances not described in detail here.

If the apparatus according to a feature of the invention comprises a sensor which detects the infrared radiation essentially originating from the melt in the region of the weld point and from the already consolidated region behind it and conveys the corresponding signals to the evaluating and monitoring unit, open pores, holes and splashes, in particular, are detected.

If the gap width exceeds a specific value, a fault or a defective weld can often be assumed in advance. For this case, the evaluating and monitoring unit according a feature of the invention comprises a comparator which compares the detected gap width with a stored maximum permitted gap width and transmits a fault signal if it is exceeded.

The development of the invention according to a feature of the invention in which the evaluating and monitoring unit is connected to an apparatus capable of supplying additive to the gap in the weld point is particularly advantageous, in particular in the case of wide gaps. Owing to this additive feeder, a depression in the gap can be prevented and the quality of the weld significantly improved if necessary.

According to a feature of the invention, the quantity of additive supplied to the gap can be adapted to the requirements predetermined by the gap width. With this development, in fact, a reference formula can be stored in a memory of the evaluating and monitoring unit, which reference formula reproduces the dependency of the necessary quantity of additive on the gap width in the weld point with a predetermined minimum quality of the weld and in which the evaluating and monitoring unit comprises a calculating circuit capable of calculating the necessary quantity of additive from the signal corresponding to the gap width on the basis of the reference formula and transmitting a corresponding control signal to the additive feeder.

Finally, it is proposed according to a feature of the invention that the apparatus which generates the weld point be pivotal transversely to the longitudinal coordinate of the gap together with the sensors detecting the radiation and thus be capable of following the gap. This development is preferred if the gap has kinks between the workpieces.

BRIEF DESCRIPTION OF THE DRAWINGS

An embodiment of the invention is described in more detail hereinafter with reference to the drawings.

DETAILED DESCRIPTION OF PREFERRED EMBODIMENTS

Figure 1:
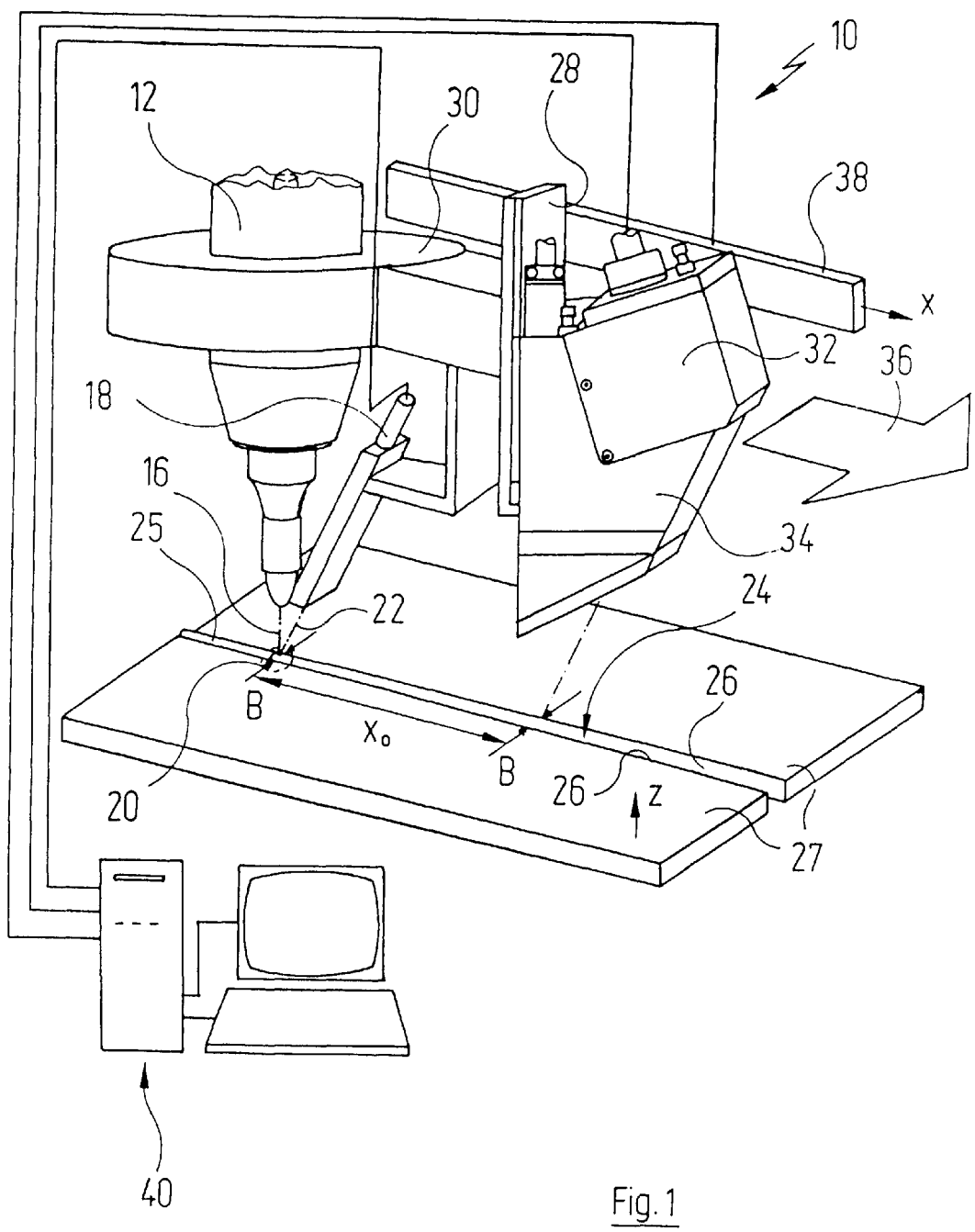
FIG. 1 is a perspective view of an apparatus for welding two workpieces between which there is a gap.

In FIG. 1, an apparatus for the welding of two plate-shaped workpieces is provided overall with reference numeral 10. It comprises a laser 12 which generates a welding laser beam 16 via an optical system (not shown). In the region of the laser 12 is arranged a senor 18 which receives, via an optical system (not visible), the radiation 22 issuing from a weld point 20 or a region of the weld seam following it. The sensor 18 can be an infrared or/and an ultraviolet sensor. The weld point 20 is generated in the region of a gap 24 between the abutting edges 26 of the plate-shaped workpieces 27. The workpiece edges 26 are connected by a weld seam 25 behind the weld point 20.

The apparatus which generates the weld point can also be any other installation instead of the laser 12 which is capable of generating a corresponding weld point. A high frequency induction welding apparatus, for example, is an installation of this type.

The laser 12 is fastened on a framework 28 via a holder 30. An angle piece (without reference numeral) which carries the sensor 18 is mounted on the holder 30.

A CCD camera 32 with an optical system 34 is also mounted on the framework 28. The CCD camera is orientated with the optical system 34 toward a position of the gap 24 located at a constant distance $X_0$ from the weld point 20.

The framework with the laser 12, the sensor 18 and the CCD camera 32 is moved in the direction of the arrow 36 relative to the gap 24 by a mechanism (not shown) Therefore, a position of the gap 24 is first detected by the CCD camera 32 and, when the framework 28 has advanced by the distance $X_0$, is machined by the laser 12. The displacement of the framework 28 in the direction of the longitudinal coordinate X of the gap is detected by an incremental transducer 38 which is designed as a displacement transducer and is shown merely schematically in FIG. 1.

The holder 30 with the laser 12 and the sensor 18 can be pivoted transversely to the gap 24 by a mechanism (not shown), so a gap laterally offset, for example, by a kink, can also be machined.

Figure 2:
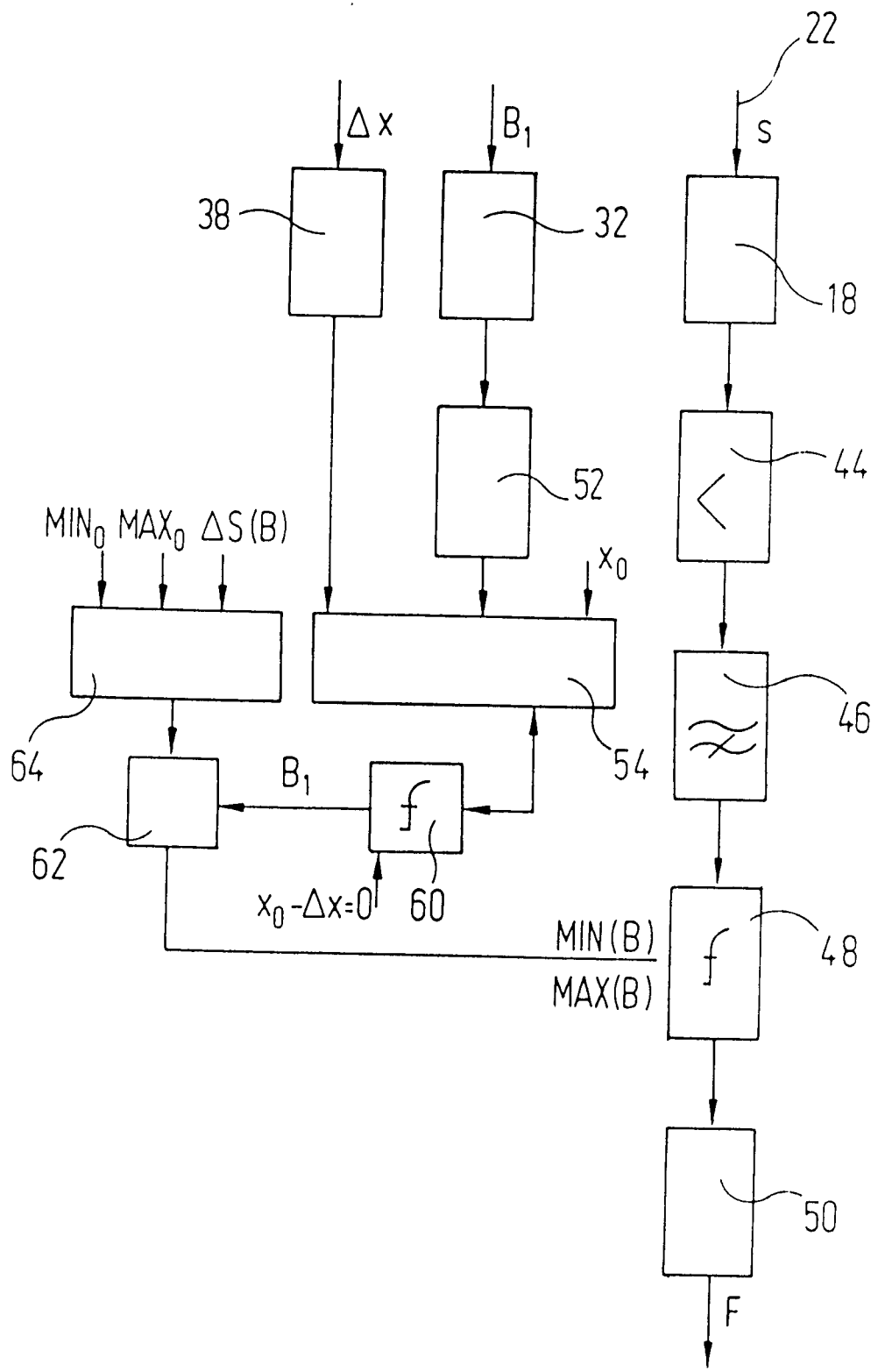
FIG. 2 is a block diagram of the signal processing electronic system of the apparatus shown in FIG. 1.
Figure 3:
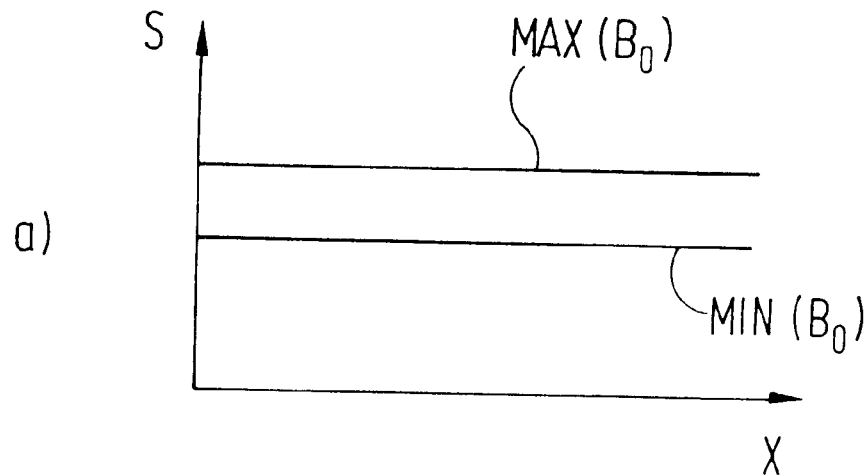
FIG. 3 shows three graphs a, b and c, the upper and lower signal limit MAX($B_0$) and MIN($B_0$) being plotted over the longitudinal coordinate X of the gap with a theoretical gap width zero in FIG. 3a, the actual gap width B as a function of the longitudinal coordinate X of the gap in FIG. 3b and the signal correction S(B) dependent on the gap width B in FIG. 3c.
Figure 3:
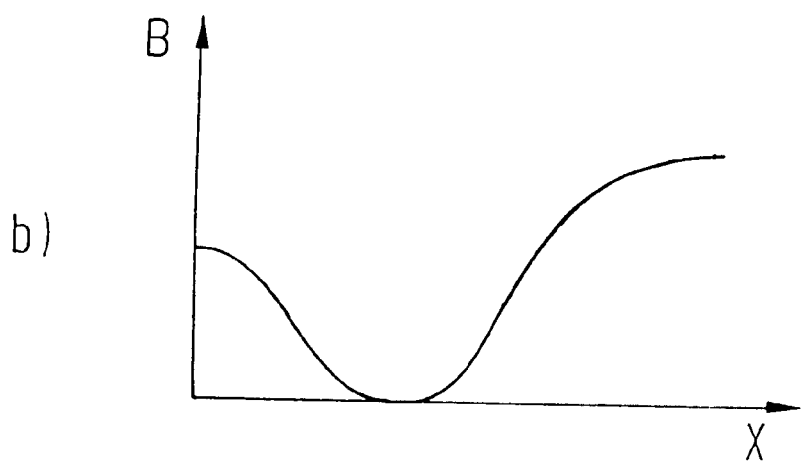
Figure 3:
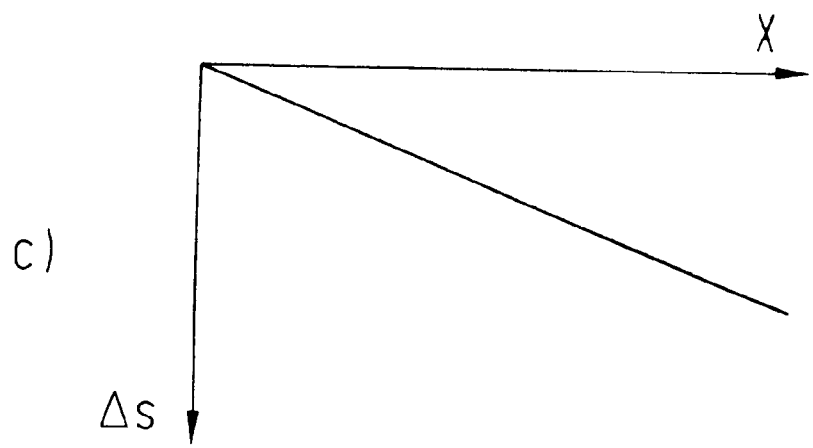

The sensor 18, the CCD camera 32 and the incremental transducer 38 are connected to an evaluating and monitoring unit 40 by means of which the welding process is monitored. Details of signal processing in the evaluating and monitoring unit 40 will now be given in conjunction with FIGS. 2 to 4.

Radiation 22 of a specific wavelength with intensity S issuing from the weld point 20 and its environment, in particular the region which follows when viewed in the welding direction, is detected by the sensor 18 and amplified by an amplifier 44. This radiation can be both infrared and ultraviolet radiation, the significance of which is described in the above-mentioned U.S. Pat. No. 5,272,312. The amplifier 44 conveys the signal to a filter 46 which optionally filters out offending ambient light. From there, the signal passes to a comparator 48 which compares the signal S with an upper limit value MAX(B) and a lower limit value MIN(B) and generates a fault signal F at the interface 50 when these limit values are exceeded. In other cases, several upper limits $MAX_n(B)$ and several lower limits $MIN_n(B)$ which produce different fault signals $F_n$ can also be provided.

The limits MIN(B) and MAX(B) are variable and depend on the width B in the weld point 20. The variable limits MIN(B) and MAX(B) are defined as follows:

A local gap width B is detected by the CCD camera 32 leading the weld point 20 by the distance $X_0$ and is processed in a known image evaluating circuit 52. The displacement $\Delta X$ of the framework 28 in the direction of the arrow 36 is detected, in terms of distance, by the incremental transducer 38. The signal corresponding to the local gap width B is deposited in a memory S4 together with the variable $X_0 - \Delta X$.

If the variable attains the value 0, which is the case when the laser 12 and the weld point 20 are located at the position of the gap 24 with the stored width B, this is observed by a comparator 60 and this value corresponding to the prevailing gap width B in the weld point 20 conveyed to a calculating circuit 62.

Alternatively, the value B can also be read out after a period in which the framework 28 covers the distance $X_0$ between CCD camera and weld point.

In an embodiment, not illustrated, a simple light sensor, which detects the gap width in the weld point via the visible quantity of light received by it and passing downward through the gap, is arranged substantially directly beneath the weld point rather than the CCD camera and the incremental transducer.

The calculating circuit 62 processes the prevailing gap width as follows:

The upper and lower limits MAX($B_0$) and MIN($B_0$) (cf. FIG. 3a) of the radiation signal S corresponding to a gap width zero and a good welding quality are stored in a memory 64. These limits have been determined in a preliminary test. A correction formula $\Delta S(B)$ (cf. FIG. 3c) which reproduces the content of the radiation signal S due to the presence of a gap 24 with the width B in the weld point 20, with a good weld quality is also stored in the memory 64. The calculating circuit 62 infers the correction value $\Delta S(B)$ belonging to the measured gap width B from the memory 64 and calculates from it, by addition to the limits MAX($B_0$) and MIN($B_0$), the corrected limits MIN(B) and MAX(B) corresponding to the gap widths present in the weld point 20 (cf. FIG. 4) for the signal S according to the following formulae:

$$MIN(B) = MIN(B_0) + \Delta S(B);$$

$$MAX(B) = MAX(B_0) + \Delta S(B).$$

It has been assumed in the embodiment described here that the intensity S of the radiation signal 22 is reduced by the presence of the gap 24 which leads to the negative correction value $\Delta S(B)$ shown in FIG. 3c. However, the intensity of radiation can also be increased as a function of the workpiece material and the gap geometry if the width of the gap increases.

The limit values MIN($B_0$) and MAX($B_0$) corresponding to a weld without a gap can either be introduced into the memory 64 by hand or can be defined and stored automatically with monitored maintenance of a good weld quality during a preliminary test. This second possibility has the advantage that factors which are specific to the installation and to the material can also be allowed for when producing the limit values. The same applies to the correction formula $\Delta S(B)$ which can either be introduced into the memory 64 by hand or can be determined automatically during a preliminary test.

Figure 4:
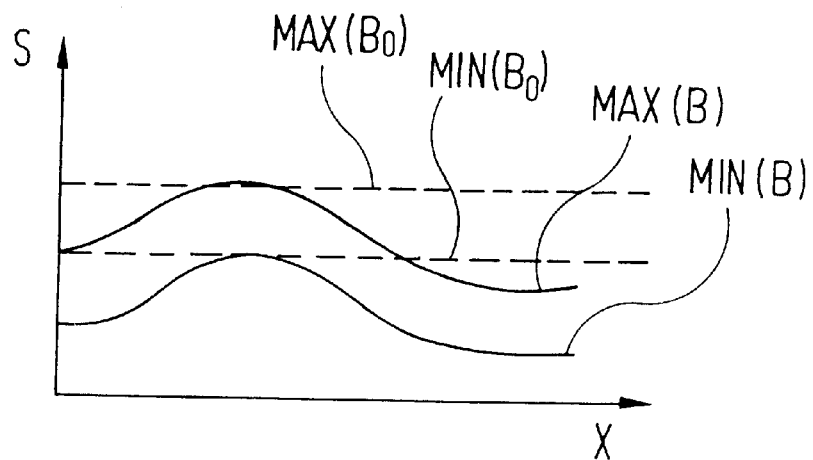
FIG. 4 is a graph indicating the upper and lower limit values MAX(B) and MIN(B) of the radiation signal over the longitudinal coordinate X of the gap corrected according to the gap width.

As shown in particular in FIG. 4, the rigid limits MAX($B_0$) and MIN($B_0$) corresponding to a gap of width 0 are replaced by variable limits MAX(B) and MIN(B) corresponding to the local gap width B by the above-described Drocedure so unnecessary fault messages are not caused by the gap width. The tolerance band limited by the variable limits MAX(B) and MIN(B) is still sufficiently narrow so actually occurring weld faults can be reliably detected.

Figure 5:
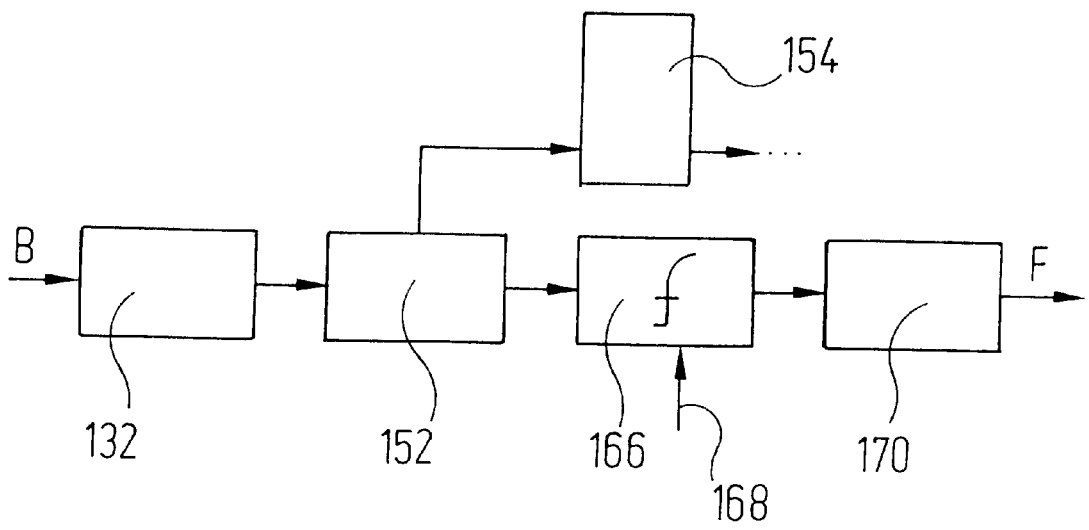
FIG. 5 is a block diagram showing the signal processing electronic system of a part of a second embodiment of the apparatus with monitoring of the permitted gap width.

FIG. 5 shows a part of the signal processing in a second embodiment of an apparatus for the welding of workpieces. Elements which correspond to the first embodiment are provided with the same reference numerals plus 100 and are not described again in detail here.

The part of the signal processing electronic system shown in FIG. 5 enables the detected gap width to be compared with a stored, maximum permitted gap width. The gap width B is detected by the CCD camera 132 and processed in an image evaluating circuit 152. The signal determined there and denoting the gap width B is conveyed on the one hand to the memory 154 which is followed by the processing stages according to the first embodiment. The width signal S, on the other hand, is conveyed by the electronic unit 152 to a comparator 166 which compares the detected width B with a predetermined limit value 168 for a maximum gap width. When the limit value 168 is exceeded, a fault signal F is transmitted via an interface 170. A gap which can no longer be welded by the laser beam can be detected promptly in this way.

Figure 6:
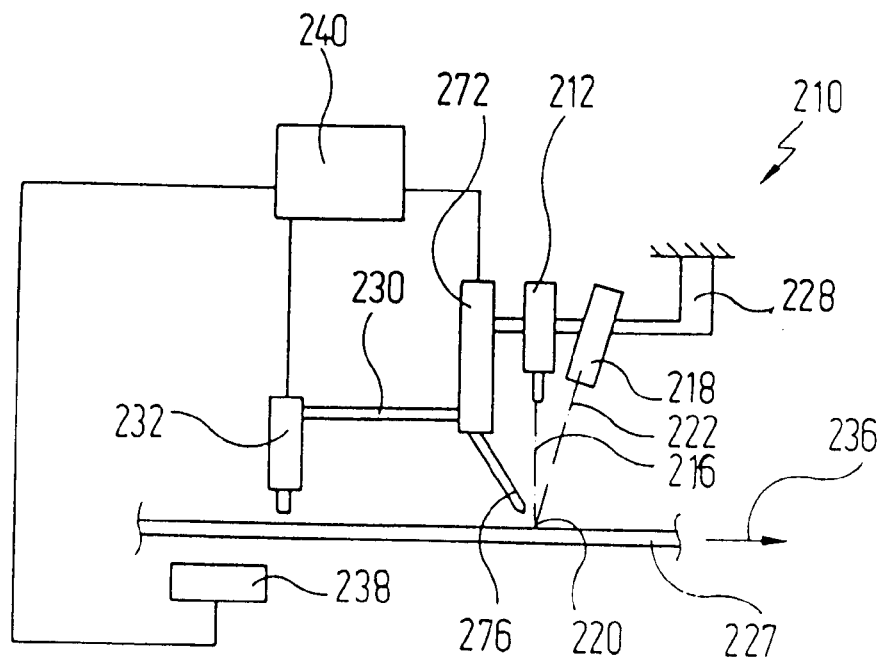
FIG. 6 is a schematic diagram of a third embodiment of an apparatus with additive feeder.
Figure 7:
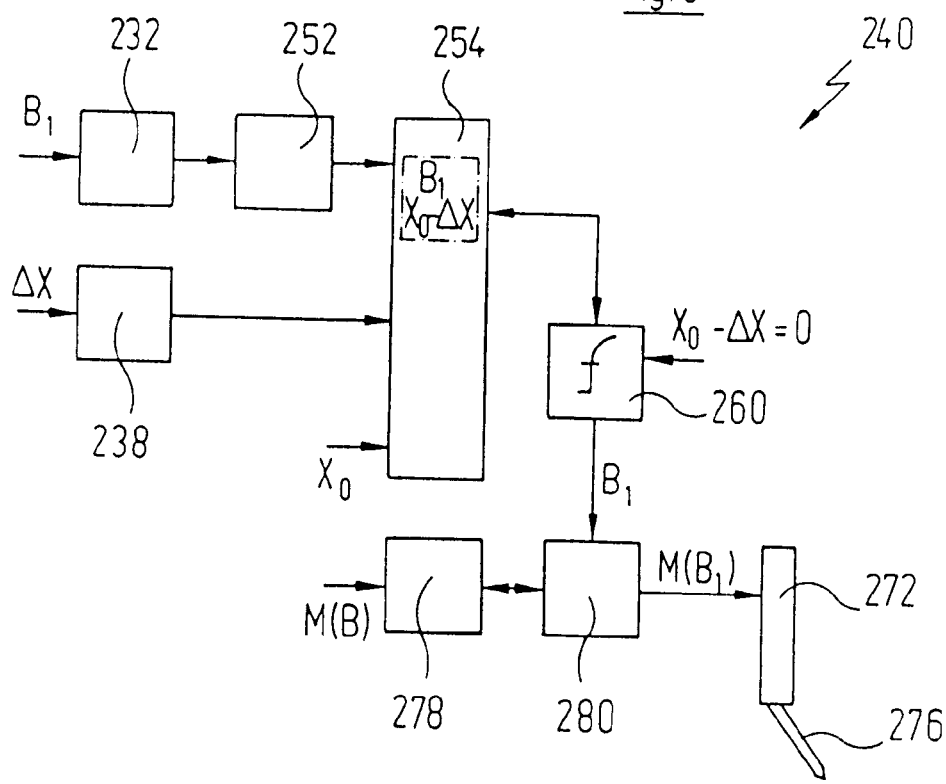
FIG. 7 is a block diagram showing the essential components of the signal processing electronic system for the additive feeder in FIG. 6.

FIGS. 6 and 7 show part of a third embodiment of an apparatus for the welding of workpieces. Parts which correspond to the first embodiment are provided with the same reference numeral plus 200. They will not be dealt with again in detail in connection with FIGS. 7 and 8. In contrast to the foregoing embodiments, this apparatus has an apparatus 272 capable of supplying additive in powder or wire form to the gap in the weld point 220 via a nozzle 276. This additive feeder 272 applies, in particular, to the part of the apparatus 210 shown in FIGS. 7 and 8.

The additive feeder 272 is fastened on a framework 228 on which a laser 212 and sensor 218 are also disposed. A CCD camera 232 is fastened on the additive feeder 272 via a holder 230. The additive feeder 272, the CCD camera 232 and the incremental transducer 238 are connected to an evaluating and monitoring unit 240.

Signal processing in the evaluating and monitoring unit 240 will now be dealt with in detail in conjunction with FIG. 7:

The width B of the gap in the weld point 220 is defined as in embodiments 1 and 2. The evaluating and monitoring unit 240 additionally comprises a memory 278 in which a reference curve M(B) can be stored. The reference curve M(B) indicates the dependency of the necessary quantity of additive on the gap width B in the weld point 220 with a predetermined minimum quality of the weld. A calculating circuit 280 receives from the comparator 260 the value of the prevailing width B in the weld point 220, calculates the necessary quantity M(B) of additive on the basis of the curve M(B) stored in the memory 276 and transmits a corresponding control signal to the additive feeder 272.

In this way, even large gaps between the workpieces 227 can be filled with material and then welded.

To conclude, it is pointed out that the components shown in the block diagrams should only be understood as logic modules and, in a modern welding installation, are combined and embodied in a programmable CPU.

What is claimed is:

1. Method of welding workpieces, between which there is a gap, at least in portions, in which
   a) at least one signal corresponding to radiation issuing from the workpieces during the welding process is generated for monitoring and controlling the welding process;
   b) limit values MAX ($B_0$), MIN($B_0$) of the radiation signal which must not be exceeded or fallen below with gap width zero for maintaining a weld of predetermined minimum quality is determined in a preliminary test;
   c) the signal is compared with at least one predetermined limit value MAX(B), MIN(B) for checking the quality of the welding process and a fault signal is generated if this limit value is exceeded or fallen below;
   characterized in that in a preliminary test
   d) a correction formula ($\Delta S$ (B)) is produced which represents the dependency of the radiation signal on a gap width (B) in the weld point (20) with a predetermined minimum quality of the weld;
   and during the actual welding process
   e) the width (B) of the gap (24) in the weld point (20; 220) is defined; and
   f) prevailing limit values (MIN(B), MAX(B)) are displaced by an amount ($\Delta S$ (B)) corresponding to the prevailing gap width (B) in the weld point (20; 220) relative to the limit values MAX($B_0$), MIN($B_0$)) determined in preliminary tests on the basis of the correction formula ($\Delta S$ (B)).

2. Apparatus for welding workpieces between which there is a gap, with
   a) an apparatus which generates a weld point;
   b) at least one sensor to which radiation issuing from the workpieces is supplied for monitoring and controlling the welding process and which conveys a signal corresponding to this radiation to an evaluating and monitoring unit;
   wherein
   c) the evaluating and monitoring unit comprises a memory in which there can be stored at least one limit value (MAX ($B_0$), MIN($B_0$)) which is determined in a preliminary test and which must be exceeded or fallen below with gap width zero in a weld of predetermined quality;

d) the evaluating and monitoring unit comprises a comparator which compares the prevailing radiation signals with the stored limit value and generates a fault signal when this limit value is exceeded or fallen below;

characterized in that e) the apparatus (10; 210) comprises at least one sensor (32, 38; 132; 232, 238) by means of which the gap width (B) in the weld point (20; 220) can be defined;

f) the evaluating and monitoring unit (40; 240) comprises a memory (64) in which there can be stored a correction formula ($\Delta S$ (B)) which reproduces the dependency of the signal (S) on the gap width (B) in the weld point (20; 220) with a predetermined minimum quality of the weld;

g) the evaluating and monitoring unit (40; 240) comprises a calculating circuit which displaces the limit values ($MIN(B_0)$, $MAX(B_0)$) during the welding process by an amount ($\Delta S$ (B)) corresponding to the instantaneous gap width (B) in the weld point (20; 220) according to the stored correction formula ($\Delta S$ (B)).

3. Apparatus according to claim 2, characterized in that the apparatus for generating the weld point comprises a laser (12).

4. Apparatus according to claim 2, characterized in that the apparatus for generating the weld point comprises a high frequency induction welding apparatus.

5. Apparatus according to claim 2, characterized in that the sensor (32; 132; 232) detecting the gap width (B) is orientated such that it leads the weld point (20; 220) by a constant distance ($X_0$) a second sensor (38, 238) detecting the relative displacement ($\Delta X$) between the first sensor (32; 132; 232) and the workpieces (27; 227) occurring during the welding process is provided, the evaluating and monitoring unit (40; 240) comprises a memory (54; 254) in which the width (B) of the gap (24) can be stored when the first sensor (32; 232) is passed and the evaluating and monitoring unit (40; 240) has a comparator (60) which retrieves the stored width (B) when the weld point (20; 220) passes the position with width (B).

6. Apparatus according to claim 5, characterized in that the first sensor is an electronic camera, in particular a CCD camera (32; 132; 232).

7. Apparatus according claim 5, characterized in that the second sensor is an incremental transducer (38; 238).

8. Apparatus according to claim 2, characterized in that the evaluating and monitoring unit (40; 240) is so orientated that, during at least one preliminary test, the limit value ($MIN(B_0)$ $MAX(B_0)$) for gap width zero corresponding to a predetermined duality, for the radiation signal (S), can be defined in a self-learning manner by the evaluating and monitoring unit (40; 240) and can be stored in a memory (64).

9. Apparatus according to claim 2, characterized in that the evaluating and monitoring unit (40; 240) is so orientated that, during a preliminary test, with a predetermined minimum quality, the dependency of the signals (S) on the gap width (B) in the weld point (20; 220) can be defined in a self-learning manner by the evaluating and monitoring unit (40; 240) and can be stored in a memory (64) as corresponding correction formula ($\Delta S(B)$).

10. Apparatus according to claim 2, characterized in that it comprises a sensor which detects the ultraviolet radiation originating essentially from the steam capillaries in the weld point and conveys the corresponding signals to the evaluating and monitoring unit (40; 240).

11. Apparatus according to claim 2, characterized in that it comprises a sensor which detects the infrared radiation originating essentially from the melt in the region of the weld point and from the already consolidated region located behind it and conveys the corresponding signals to the evaluating unit.

12. Apparatus according to claim 2, characterized in that the evaluating and monitoring unit (140) comprises a comparator (166) which compares the detected gap width (B) with a stored maximum permitted gap width (168) and transmits a fault signal (F) when this value is exceeded.

13. Apparatus according to claim 2, characterized in that the evaluating and monitoring unit (240) is connected to an apparatus (272) capable of supplying additive to the gap in the weld point (220).

14. Apparatus according to claim 13, characterized in that the evaluating and monitoring unit (240) comprises a memory (278) in which there can be stored a reference formula (M(B)) which reproduces the dependency of the necessary quantity of additive on the gap width (B) in the weld point (220) with a predetermined minimum quality of the weld and in that the evaluating and monitoring unit (240) comprises a calculating circuit (280) which can calculate the necessary quantity (M(B)) of additive from the signal corresponding to the prevailing gap width (B) on the basis of the reference formula (M(B)) and can transmit a corresponding control signal to the additive feeder (272).

15. Apparatus according to claim 2, characterized in that the apparatus (12) which generates the weld point (20; 220) is pivotal transversely to the longitudinal coordinate (X) of the gap together with the sensors (18; 218) detecting the radiation.

* * * * *